United States Patent
Albayrak et al.

(10) Patent No.: US 7,342,759 B2
(45) Date of Patent: Mar. 11, 2008

(54) POWER SUPPLY UNIT HAVING A MAINS SUPPRESSION FILTER FOR AN ELECTRICALLY OPERATED DOMESTIC APPLIANCE

(75) Inventors: Hasan Gökcer Albayrak, Berlin (DE); Bernd Duldhardt, Berlin (DE); Thomas Ludenia, Falkensee (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 568 days.

(21) Appl. No.: 10/991,250

(22) Filed: Nov. 17, 2004

(65) Prior Publication Data

US 2005/0113980 A1 May 26, 2005

Related U.S. Application Data

(63) Continuation of application No. PCT/EP03/05006, filed on May 13, 2003.

(30) Foreign Application Priority Data

May 17, 2002 (DE) ................ 102 22 108

(51) Int. Cl.
*H02H 7/00* (2006.01)
(52) U.S. Cl. ..................................... 361/63
(58) Field of Classification Search .............. 361/63
See application file for complete search history.

(56) References Cited

U.S. PATENT DOCUMENTS 4,628,443 A * 12/1986 Rickard et al. ............... 700/79

FOREIGN PATENT DOCUMENTS

| EP | 0 593 862 A1 | 4/1994 |
| EP | 1 107 415 A2 | 6/2001 |
| GB | 2 163 303 A | 2/1986 |

* cited by examiner

*Primary Examiner*—Stephen W. Jackson
(74) *Attorney, Agent, or Firm*—Russell W. Warnock; James E. Howard

(57) ABSTRACT

A central power supply device for an electric supply of a domestic appliance and an electronic control unit of the appliance is connected to an output side of an interference suppression filter. The aim is to integrate recurrent, standardized devices in such a way that components are not allocated functions that do not belong to their task domain. To achieve this, an automatically controlled network disconnection device is integrated, together with the interference suppression filter, into the phase conductor, or in addition into the neutral conductor. A power supply device for an electronic control logic circuit of the network disconnection device is connected to the input side of the network disconnection device and the control output of the control logic circuit is connected to the control input of the network disconnection device.

14 Claims, 1 Drawing Sheet

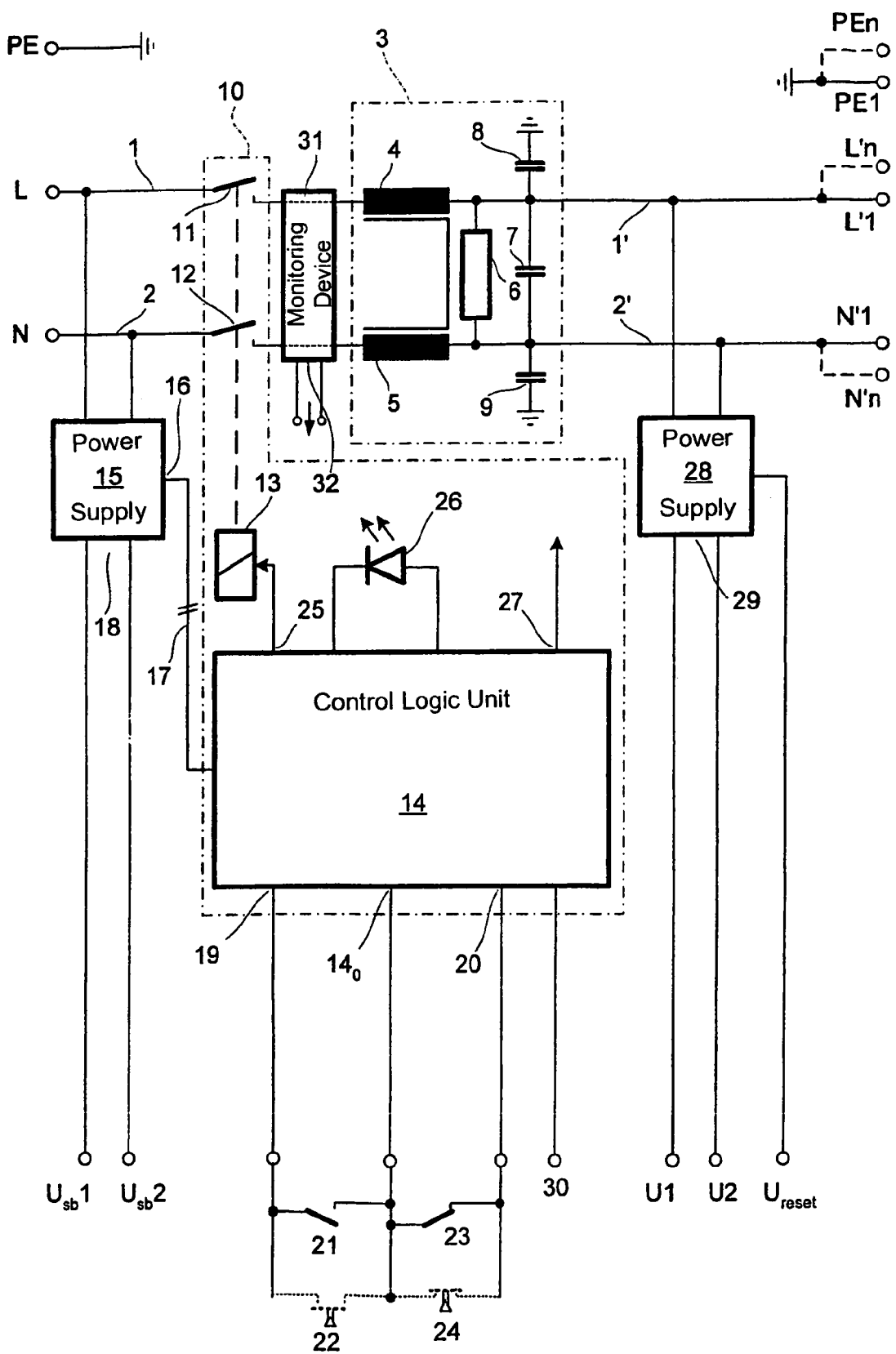

POWER SUPPLY UNIT HAVING A MAINS SUPPRESSION FILTER FOR AN ELECTRICALLY OPERATED DOMESTIC APPLIANCE

CROSS-REFERENCE TO RELATED APPLICATION

This is a continuing application, under 35 U.S.C. § 120, of copending international application No. PCT/EP03/05006, filed May 13, 2003, which designated the United States; this application also claims the priority, under 35 U.S.C. § 119, of German patent application No. 102 22 108.1, filed May 17, 2002; the prior applications are herewith incorporated by reference in their entirety.

BACKGROUND OF THE INVENTION

FIELD OF THE INVENTION

The invention relates to a power supply unit having a mains suppression filter to whose output side the central power supply device for the electrical equipment in a domestic appliance and of at least one electronic controller in the domestic appliance is connected.

A connection housing for electrical appliances which is known from Published, European Patent EP 0 593 862 A1 is of a type in which a mains suppression filter—in this case a simple capacitor—is accommodated in the power supply unit. The document admittedly does not describe the central power supply device for the electrical equipment and an electronic controller. However, since these devices are regular constituents of present-day electrical appliances, the known connection housing can be regarded as a model of the power supply unit mentioned in the introduction.

SUMMARY OF THE INVENTION

It is accordingly an object of the invention to provide a power supply unit having a mains suppression filter for an electrically operated domestic appliance that overcomes the above-mentioned disadvantages of the prior art devices of this general type. The invention is based on the object of further integrating continuously recurring, standardized devices into electrical appliances such that functional assemblies are kept free of functions which are not part of their range of tasks. Therefore, continuously recurring functions in the field of the electrical supply of assemblies can be standardized and, for a very wide range of domestic appliances, stocked with large numbers of identical parts at a lower cost than previously.

With the foregoing and other objects in view there is provided, in accordance with the invention, a power supply unit. The power supply unit contains a mains suppression filter having an output side to be connected to a central power supply device for electrical equipment in a domestic appliance and to at least one electronic controller in the domestic appliance and an automatically controllable mains disconnection apparatus. The mains disconnection apparatus, together with the mains suppression filter, are connected in at least one mains cable, such as phase lines and neutral conductors. The mains disconnection apparatus has an input side, a control input and a control logic unit with a control output. The control output of the control logic unit is connected to the control input. A power supply device is connected to the input side of the mains disconnection apparatus.

According to the invention, the object is achieved by an automatically controllable mains disconnection apparatus, together with the mains suppression filter, being connected in the live conductor or phase conductors or additionally in the neutral conductor. The power supply device for an electronic control logic unit of the mains disconnection apparatus being connected to the mains input side of the mains disconnection apparatus, and the control output of the control logic unit being connected to the control input of the mains disconnection apparatus.

In contrast to the prior art, the power supply unit according to the invention has the advantage that universal functional parts can be removed from the respective components, which to date have been combined with the aforementioned functional parts (control logic unit, power supply devices) and as a result, in some circumstances, been present more than once in the domestic appliance, specifically in different components, to the extent that, first, the components can be more effectively geared toward their specific requirements and, second, are naturally cheaper due to this removal. A greater surface area is then also available on the respective circuit boards of the components for other circuitry.

Admittedly, these functional parts are nevertheless necessary. However, since they are now accommodated centrally, specifically in the power supply unit, each component does not require a dedicated functional part (that is to say fewer functional parts are accommodated in a domestic appliance overall) and the functional parts, which are the same for all or at least a plurality of types of domestic appliances, can be increased in number and contribute to a rationalization effect.

Since the mains disconnection function is in principle included in the power supply unit, still further advantages are obtained. First, space for the mains switch can be saved on the control panel. The mains suppression filter is no longer continuously at the mains voltage and as a result lower-cost filter capacitors can be used (grade X2 rather than X1). A short-travel button, a membrane button, a touch sensor or the like now suffices as a handle used to perform the function of the mains switch, as compared to a push-to-lock button, as required previously, or a toggle or rocker switch. As a result, more convenient haptics and optics can be achieved. The lower space requirement for a handle of this type also permits a wider choice of arrangement spaces.

The invention can advantageously be developed by the control logic unit having at least one input for trigger signals and a switching apparatus which switches the mains disconnection apparatus on and/or off as soon as a trigger signal is applied to the input. Trigger signals of this type can be obtained from components disposed distributed throughout the domestic appliance without the need for considerable extra complexity. The switching apparatus for switching the mains disconnection apparatus on and off is required in any case and need be provided only once in each domestic appliance.

The safety-related object is achieved without great complexity if, according to a further advantageous development of the invention, at least one of the inputs for trigger signals is associated with a fault state which results in emergency disconnection of the power supply to the electrical equipment when a trigger signal is applied to the input. A fault state of this type may be, for example, a ground short in the electrical equipment, a break in the drive belt or the like, that is to say a state in which any component within the domestic appliance is not functioning correctly or has lost a safety-related property. The fault state is then intended to produce an output signal from the control logic unit, causing the mains disconnection apparatus to interrupt the phase lines or additionally the neutral conductor.

One refinement of the invention would be of particular advantage specifically if the control logic unit had an output for a signal to an optical or acoustic sensor that, in the event of an emergency disconnection measure, receives a positive signal. The operator of the domestic appliance would then be very well informed as soon as such a fault state occurred.

Instead of direct activation of this type, it would also be possible, according to another advantageous development of the invention, for the control logic unit to have an output for an electrical signal to the electronic controller that, in the event of an emergency disconnection measure, generates an optical or acoustic indication signal.

The control logic unit can be reset, according to a further advantageous development of the invention, as a function of a specific prior operation. An upstream operation of this type automatically forces certain attention to be paid to a fault state that has led to emergency disconnection. A specific operation such as this could be, for example, the active initiation—for example on a switching device of the power supply unit—of a release signal or pulling of the mains plug.

In a particularly advantageous manner, the power supply device for the control logic unit has at least one output which is connected to at least one component of the electrical equipment in the domestic appliance for stand-by power supply. As a result, a function, which otherwise requires a particular measure on the circuit board of the relevant component, can be included at low cost in the power supply device which is present in any case.

If a general power supply device for at least one component of the electrical equipment in the domestic appliance is connected to the mains cables downstream of the mains disconnection apparatus in the supply direction, the general power supply for components for the low-voltage range can also be provided in the power supply unit in this case. This also contributes to reducing costs and susceptibility to faults.

If the general power supply device also has an output which can emit a power-down signal and/or a power-up signal to an electronic controller, further devices for resetting or maintaining the basic state of a program control device can be dispensed with, such that costs can be reduced in this respect too.

Other features which are considered as characteristic for the invention are set forth in the appended claims.

Although the invention is illustrated and described herein as embodied in a power supply unit having a mains suppression filter for an electrically operated domestic appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a block circuit diagram of a power supply unit according to the invention.

DESCRIPTION OF THE PREFERRED EMBODIMENTS

Referring now to the single drawing of the FIGURE in detail there is shown an electrical circuit diagram of a power supply unit according to the invention. In the power supply unit, two lines 1 and 2 and, respectively, 1' and 2' are routed from mains terminals L and N to the power supply terminals L'1 and N'1. In addition, grounding terminals PE (on the input side) and PE1 (on the supply side) are of course present. In the case of a power supply with more than one phase, correspondingly more phases can of course be carried using suitable lines. Correspondingly, further terminals can naturally be provided to supply further components. This is indicated on the supply side by the dashed lines and terminals L'n, N'n and PEn.

A mains suppression filter 3, which has two magnetically coupled inductors 4 and 5, one parallel resistor 6 and three capacitors 7, 8 and 9, is present in the lines 1, 1' and 2, 2'. These devices are standard components in an electrical supply device for electronically controlled domestic appliances.

According to the invention, a switch 11 and a switch 12 are each connected in the lines 1 and 2 on the feed side of the mains suppression filter 3 of a mains disconnection apparatus 10. However, the mains disconnection apparatus also includes a control relay 13 for the switches 11 and 12, which itself can be activated or deactivated by a control logic unit 14.

A power supply device 15 is also connected to the conductors 1 and 2 on the feed side, an output 16 of the power supply device 15 supplying the control logic unit 14 with voltage by two lines 17 which are only indicated. An output 18 of the power supply device 15 is connected to terminals $U_{sb}1$ and $U_{sb}2$ that can be used for voltages for maintaining stand-by states.

The control logic unit 14 has a plurality of edge-triggered and/or pulse-triggered and/or static inputs 19 and 20 with a positive or negative characteristic. There is a potential difference between the inputs 19 and 20 and a connection $14_0$, and this difference is passed to one of the inputs 19 or 20 by switches 21 or buttons 22 for switching on or switching off the supply to the rest of the electrical equipment in the domestic appliance, or by a plurality of switches 23 or buttons 24 for (temporarily or completely) disconnecting the electrical supply, or is disconnected from one of these inputs. As a result, a positive or negative signal would be produced at the output 25 of the control logic unit 14, which signal switches the switches 11 and 12 in the lines 1 and 2 on or off for operation or due to a risk.

In the event of the lines 1 and 2 being disconnected due to a risk—so-called emergency disconnection—the operator is also informed of the emergency disconnection by an optical signaling device 26. As an alternative, or in addition, an acoustic indication may be given. Also as an alternative, or in addition, an electrical signal relating to the state of the emergency disconnection of a non-illustrated electronic control device can be supplied by the line 27 to the control logic unit 14.

Furthermore, a general power supply device 28 for at least one component of the electrical equipment of the domestic appliance is connected to the output of the mains suppression filter 3 (supply lines 1' and 2'). This may be a general supply for supplying the electrical equipment with low voltages U1 and U2 whose levels are regulated and which are produced at an output 29 of the power supply device. The power supply device may also have an output for a reset signal $U_{reset}$ that performs a power-down or a power-up operation on the electrical equipment in the domestic appliance.

The control logic unit 14 can—for example as a function of the type or the location of the fault state—make a decision as to whether the emergency disconnection should be performed only temporarily or absolutely. In the latter case, particular operations may be required in order to be able to reverse the emergency disconnection. For example, it may be necessary to completely disconnect the lines 1 and 2 from the mains, that is to say for example to pull the mains plug, in order to reset the emergency disconnection. One other possibility is to enter a release signal via the input 30 of the control logic unit 14.

A monitoring device 31 for checking the current and/or the voltage in or across the mains cables 1, 1', 2, 2' can optionally be connected upstream of the mains suppression filter 3 in the supply direction. If the current and/or the voltage differ from their permissible operating values, the monitoring device emits a signal at its output 32, which signal can be processed to form a warning signal either also in the control logic unit 14 in the manner of a disconnection measure or in an electronic controller which is not illustrated in greater detail here. If the monitoring device 31 is operatively connected upstream and downstream of the mains disconnection switches 11 and 12, correct operation of these switches can also be checked.

We claim:

1. A power supply unit, comprising:
    a mains suppression filter having an output side to be connected to a central power supply device for electrical equipment in a domestic appliance and to at least one electronic controller in the domestic appliance;
    an automatically controllable mains disconnection apparatus, together with said mains suppression filter, being connected in at least one mains cable selected from the group consisting of phase lines and neutral conductors, said mains disconnection apparatus having an input side, a control input and a control logic unit with a control output, said control output of said control logic unit connected to said control input;
    a power supply device connected to said input side of said mains disconnection apparatus;
    said mains disconnection apparatus has a switching apparatus and main switches connected to said switching apparatus and coupled to said mains suppression filter, said switching apparatus forms said control input of said mains disconnection apparatus;
    said control logic unit has inputs for receiving trigger signals; and
    said switching apparatus switching said mains switches on and/or off if a trigger signal is applied to one of said inputs of said control logic unit.

2. The power supply unit according to claim 1, wherein at least one of said inputs of said control logic unit is associated with a fault state which results in emergency disconnection of power to the electrical equipment when the trigger signal is applied to said one of said inputs.

3. The power supply unit according to claim 2, wherein the fault state produces an output signal from said control logic unit, causing said mains disconnection apparatus to interrupt at least one of the phase lines and the neutral conductor.

4. A power supply unit, comprising:
    a mains suppression filter having an output side to be connected to a central power supply device for electrical equipment in a domestic appliance and to at least one electronic controller in the domestic appliance;
    an automatically controllable mains disconnection apparatus, together with said mains suppression filter, being connected in at least one mains cable selected from the group consisting of phase lines and neutral conductors, said mains disconnection apparatus having an input side, a control input and a control logic unit with a control output, said control output of said control logic unit connected to said control input;
    a power supply device connected to said input side of said mains disconnection apparatus;
    said mains disconnection apparatus has a sensor selected from the group consisting of optical sensors and acoustic sensors; and
    said control logic unit has an output connected to said sensor and outputs a signal to said sensor, said sensor, in an event of an emergency disconnection measure, receives a positive signal.

5. A power supply unit, comprising:
    a mains suppression filter having an output side to be connected to a central power supply device for electrical equipment in a domestic appliance and to at least one electronic controller in the domestic appliance;
    an automatically controllable mains disconnection apparatus, together with said mains suppression filter, being connected in at least one mains cable selected from the group consisting of phase lines and neutral conductors, said mains disconnection apparatus having an input side, a control input and a control logic unit with a control output, said control output of said control logic unit connected to said control input;
    a power supply device connected to said input side of said mains disconnection apparatus;
    wherein said control logic unit has an output for an electrical signal to be sent to the electronic controller of the domestic appliance which, in an event of an emergency disconnection measure, generates an indication signal selected from the group consisting of optical indication signals and acoustic indication signals.

6. The power supply unit according to claim 4, wherein said control logic unit can be reset after an emergency disconnection measure is carried out.

7. The power supply unit according to claim 6, wherein said control logic unit is reset as a function of a specific prior operation.

8. The power supply unit according to claim 7, wherein a specific operation is initiated upon generation of a release signal.

9. The power supply unit according to claim 8, further comprising a switching device to initiate the release signal.

10. The power supply unit according to claim 8, wherein the specific operation involves pulling of mains plug.

11. A power supply unit, comprising:
    a mains suppression filter having an output side to be connected to a central power supply device for electrical equipment in a domestic appliance and to at least one electronic controller in the domestic appliance;
    an automatically controllable mains disconnection apparatus, together with said mains suppression filter, being connected in at least one mains cable selected from the group consisting of phase lines and neutral conductors, said mains disconnection apparatus having an input side, a control input and a control logic unit with a control output, said control output of said control logic unit connected to said control input; and a power supply device connected to said input side of said mains disconnection apparatus;

wherein said power supply device supplies said control logic unit and has at least one output which is connected to at least one component of the electrical equipment in the domestic appliance for providing stand-by power supply.

12. The power supply unit according to claim 11, further comprising a general power supply device for supplying at least one component of the electrical equipment in the domestic appliance, said general power supply device connected to the mains cable downstream of said mains disconnection apparatus in a supply direction.

13. The power supply unit according to claim 12, wherein said general power supply device has an output which can emit a power-down signal and/or a power-up signal for an electronic controller.

14. A power supply unit, comprising:

a mains suppression filter having an output side to be connected to a central power supply device for electrical equipment in a domestic appliance and to at least one electronic controller in the domestic appliance;

an automatically controllable mains disconnection apparatus, together with said mains suppression filter, being connected in at least one mains cable selected from the group consisting of phase lines and neutral conductors, said mains disconnection apparatus having an input side, a control input and a control logic unit with a control output, said control output of said control logic unit connected to said control input;

a power supply device connected to said input side of said mains disconnection apparatus; and a monitoring device operatively connected to the mains cable upstream of said mains suppression filter in a supply direction, said monitoring device checks that a current in the mains cable and/or a voltage across the mains cable complies with operating values, and has and output emitting a signal if these values differ.

* * * * *